INVENTOR.
JOHN Z. DeLOREAN
BY Wilson, Redrow, and Sadler
ATTORNEYS.

May 20, 1958 — J. Z. DE LOREAN — 2,835,141
FLYWHEEL STRUCTURE
Filed March 31, 1955 — 2 Sheets-Sheet 2
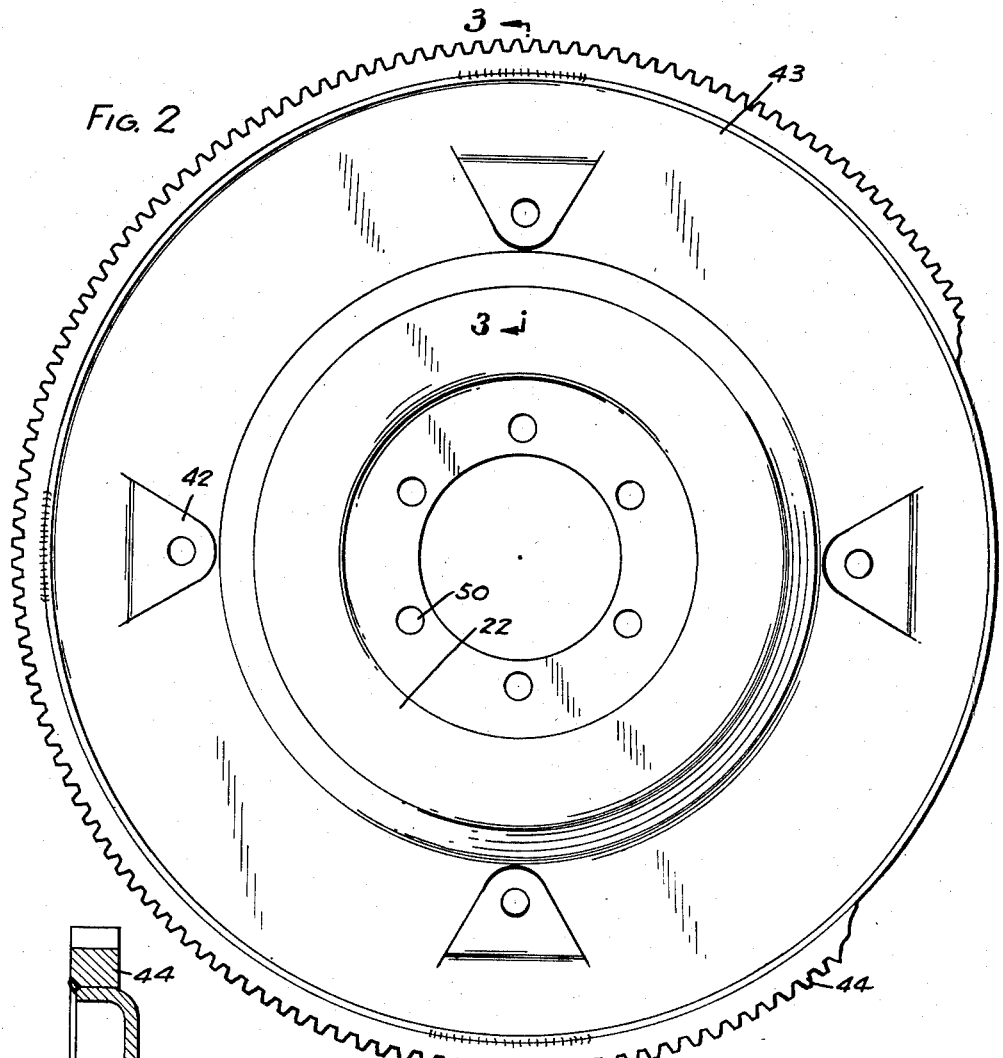
INVENTOR.
JOHN Z. DeLOREAN
BY
Wilson, Redrow, and Sadler
ATTORNEYS.

United States Patent Office 2,835,141
Patented May 20, 1958

2,835,141

FLYWHEEL STRUCTURE

John Z. De Lorean, Detroit, Mich., assignor to Studebaker-Packard Corporation, Detroit, Mich., a corporation of Michigan Application March 31, 1955, Serial No. 498,401

8 Claims. (Cl. 74—572)

The present application relates to flywheel structure and more particularly to flywheel and clutch drive plate assemblies of a type which are adapted primarily but not exclusively for use in automotive vehicles.

An object of the invention herein disclosed is to provide a lightweight flywheel and clutch drive plate assembly of strong construction adapted for efficient operation in automotive vehicles and in other installations.

Another object is to provide a flywheel and clutch drive plate assembly of multipart construction having a number of its parts and particularly the flywheel and clutch plates made of stamped sheet metal to simplify and reduce the weight of the assembly without sacrificing strength or impairing the operation of clutching in the flywheel and clutch drive assembly.

A further object of the invention is the provision of a flywheel plate in assembly with a clutch drive plate arrangement for driving a clutch, the latter arrangement being fluid tight and comprising a stamped sheet metal drive plate and a pressure plate supported by said drive plate, the sheet metal drive plate defining a chamber for pressure fluid actuating the pressure plate into engagement with the clutch.

In the past, a fluid tight drive plate of the general character defined in the preceding object has in the instances of some transmissions been provided with a plurality of circumferentially spaced apart external bosses disposed in a circular arrangement about the plate and adapted to receive thereagainst a planar flywheel or else a flywheel having a planar portion thereon adapted to be received against the bosses. As a means of eliminating a torsional balance problem in such transmissions it is an established past practice to bring the planar portion of the flywheel into exact parallelism with the boss carrying drive plate and this parallelism became an inherency of construction wherein the bosses are hollow milled to a common level whereby the contacting surface of each boss occupies a common plane with the contacting surfaces of all other bosses. The bosses, of course, were necessary anyway as a means of providing studs to which the flywheel was attached and as a rule were welded merely to the surface of the unperforated drive plate in order to allow it to preserve its fluid tight integrity without impairment.

According to the present improvement, spring tabs which may be integral are provided on the flywheel for engagement with the outer surfaces of a ring of bosses carried by a drive plate of the general character described in the preceding paragraph, and these spring tabs are deflected when compressed against the ends of the bosses so as to force the flywheel into direct contact with and in exact parallelism to the drive plate without regard to whether or not the ends of the bosses are coplanar or not with respect to one another. According to a feature of the invention, the spring tabs are actually integral with the flywheel and are formed by shearing them into an offset deflected position from the plane of the flywheel.

Further features, objects and advantages will either be specifically pointed out or become apparent when for a better understanding of the invention, reference is made to the following written description taken in conjunction with the accompanying drawings in which:

Figure 2 is a face view of the flywheel from the direction from the left in Figure 1;

Figure 3 is a sectional view taken along the section lines 3—3 of Figure 2; and

Figure 4 is a face view from the left side of Figure 1 but with the showing of Figure 2 omitted.

Figure 1:
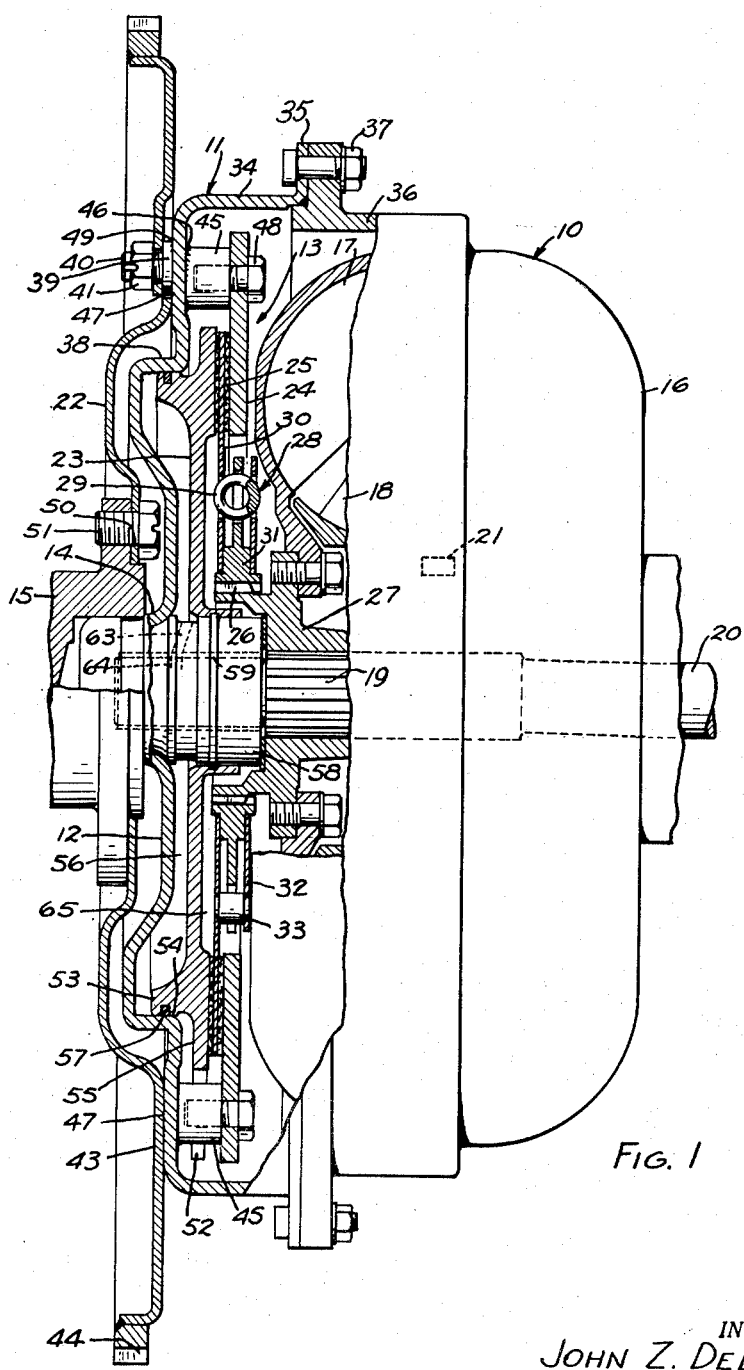
Figure 1 is a longitudinal axial section of a drive mechanism embodying the present improvement of a flywheel and clutch drive plate assembly.

In the drawings and more particularly in Figure 1, the present improved flywheel and clutch drive plate assembly is shown in combination with a hydraulic torque converter to form a drive mechanism which may be positioned between and connected to a source of prime power such as an automobile engine, and one or even more drive shafts are provided which may be connected to transmission gearing drivingly connected to the road wheels of a automobile. The drive mechanism is designed to provide mechanically parallel paths of power flow from the engine to an output shaft connected to the automobile road wheels, one of these paths containing a hydraulic torque converter 10 and the other path containing a means for disabling and locking out the torque converter 10, namely an improved flywheel and clutch drive plate assembly identified generally at 11, a clutch driving plate as shown at 12 being drivingly connected to the torque converter 10 and being capable of also being drivingly connected to an output shaft by means of a clutch assembly identified generally at 13.

The clutch driving plate 12 is formed with an integral cup shaped hub 14 which may be received within a recess in a flanged engine crank shaft 15 providing a pilot bearing type support therefor. The clutch driving plate 12 is actually a portion of a clutch and converter housing and is connected at its outer periphery to a vaned impeller section 16 of the hydraulic torque converter 10 for rotating the same. In addition to the impeller 16 the torque converter includes a vaned turbine 17 and a vaned guide wheel or reactor 18 and together with the vaned impeller defining a toroidal path for the circulation of hydraulic fluid through the hydraulic torque converter from the impeller to the turbine to the stator and thence back to the impeller for recirculation. The vaned turbine 17 is connected as by means of a set of bolts and an intermediate member later described to a set of splines as at 19 carried by an output shaft 20 so as to rotate conjointly at all times with the output shaft 20, whereas the reactor 18 is provided with a one-way brake 21 for restraining rotation of the reactor during the torque conversion stages of the hydraulic torque converter in a manner well known in the art.

Means is provided for connecting the flanged crank shaft 15 and the clutch drive plate 12 for conjoint rotation together. Illustrative of one example of such connecting means is a flywheel 22 which is believed to be novel in several regards as will hereinafter become apparent. It will be seen from the foregoing description that upon rotation of the flywheel 22 and the clutch driving plate 12 by means of the flanged crank shaft 15 of the automobile engine, the impeller 16 of the hydraulic torque converter 10 will be rotated causing rotation of the turbine 17 to effect a drive of the driven shaft 20 under multiplied torque.

The clutch driving plate 12 is drivingly connected to a pressure plate 23 and to a back plate 24 of the clutch 13 in a manner to effect conjoint rotation of the flywheel 22, the clutch drive plate 12, the pressure plate 23, and the back plate 24, the latter two plates receiving therebetween a driven clutch plate 25 fashioned with wear surface friction material at its outer periphery and splined at its inner periphery as at 26 to a hub member 27; the driven clutch plate 25 is grippingly engaged when the pressure plate 23 and the back plate 24 are brought toward one another. The hub member 27 is mounted directly to the splines 19 on the output shaft 20 and is suitably bolted at its outer periphery to the turbine 17 in the hydraulic torque converter. The driven clutch plate 25 is provided with a torsional vibration damper assembly indicated generally at 28 and being of well known construction. In essentials the torsional vibration damper assembly 28 comprises a plurality of circumferentially aligned slots or pockets for receiving a like number of coil springs 29, preferably six in number, for drivingly connecting a friction clutch carrying disk 30, a hub 31, and a plate 32, the disk 30 and the plate 32 being connected together as by means of a plurality of through rivets 33 for conjoint rotation with the internally splined hub 31.

To a little greater detail, the flywheel and clutch drive plate assembly comprises as its component parts the clutch driving plate 12, the flywheel plate 22 located at the outside of the plate 12, plus the pressure plate 23 and the back plate 24 located at the other or inner side of the clutch driving plate 12, and the driven clutch plate generally indicated at 25, the plates 12 and 22 being formed of stamped sheet metal such as springy steel or the like. The clutch driving plate 12 as shown in Figures 1 and 4 has a cylindrical outer peripheral wall 34 terminating in an outwardly turned radially extending flange 35 which overlaps with and is bolted to a radial flange on a hollow outer shell portion 36 of the impeller 16 as by means of a plurality of threaded fasteners such as at 37.

In the stamping operation, the clutch drive plate 12 is formed with a cylindrical axially extending wall 38 which together with certain evident connecting portions of the plate forms a channel shaped section providing an annular receiving channel hereinafter described more fully in detail.

The clutch drive plate 12 carries a spaced apart plurality of generally short cylindrical bosses 39 disposed thereabout in a circular path of revolution and having flat outer ends which are not necessarily in plane with one another but which each have anchored in their center portions an integral upstanding threaded stud 40, extending generally axially with respect to the plane of the plate. A self-locking flywheel attaching nut 41 is adapted to be threadingly received upon each stud 40.

In the stamping operation, the flywheel plate 22 is formed with a shallow channel shaped section having a planar radially extending mounting flange portion generally indicated at 43 disposed opposite to the open side of the resulting channel which as shown opens forwardly with respect to the flywheel. The outer leg of the channel shaped section is secured as by means of welding to a starter ring gear 44 which is carried by the flywheel 22. The ring gear carrying leg of the channel section together with the opposite leg and also the bulk of the flywheel plate 22 are disposed out of plane with respect to the planar mounting flange portion 43 of the flywheel. A plurality, actually four in number as shown in Figure 2, of inwardly directed triangular apertured tabs 42 are sheared out of the plane of the planar mounting flange portion 43 and in their relaxed position, these offset or upraised apertured tabs 42 can be seen to be disposed within the shallow channel shaped section of the flywheel plate according to Figure 3 at a slightly acute angle to the plane of the mounting flange portion 43. In one physically constructed embodiment of the invention the amount of this acute angularity was 5°.

For the purpose of mounting the planar portion 43 against a parallel backing surface, the tabs 42 may be employed so as to be deflected against their inherent spring tension to the dotted line position according to the dotted lines 42a of Figure 3 wherein the plane of each of the tabs 42 is in closely spaced juxtaposition to the plane of the planar portion 43 of the flywheel. The clutch drive plate 12 is drivingly connected to the back plate 24 by means of a plurality of bosses disposed according to a circular path of revolution and welded as at 46 to a generally flat radially extending reference wall 47 of the plate 12, with the back plate 24 being held in a predetermined axially spaced apart relation to said wall and having bolt receiving openings therein for receiving a plurality of threaded fasteners such as a bolt shown at 48 adapted to be anchored in the boss 45. Each of the bolts 48 extends through such an opening formed in the outer periphery of the back plate 24 which is thus clamped against an end of a corresponding cylindrical boss 45, six such bosses being contemplated. Similarly the cylindrical bosses 39 on the outside of the plate 12 are secured thereto by welding as at 49 in a position to be overlain by the apertured tabs 42 on the flywheel plate 22. The apertures of the tabs 42 are adapted to be passed over the threaded stud portions 40 on the bosses 39 and to be clamped between the other face of each cylindrical boss and the flywheel attaching nut 41 received on the threaded stud 40. The overlying position of the tabs relative to the bosses 39 is best seen in Figure 4 according to the dotted line showing of the tabs shown by the dotted lines 42b of Figure 4. When the tabs are actually clamped into place they assume the dotted line position shown by the dotted lines 42a in Figure 3.

The flywheel plate 22 is of a centrally open construction having a marginal hub flange about the center around which a circle of attaching flange holes 50 is located, being six in number as shown according to Figure 2. The centrally open flywheel plate 22 is received on an annularly stepped hub portion of the flanged crank shaft 15 and the flywheel is bolted securely to the flange 15 as by means of a set of threaded fasteners 51 passing through the six attaching flange holes 50 and being threadably anchored in the flange of the flanged crank shaft 15 for the engine.

The back plate 24 is drivingly connected to the pressure plate 23 so as to effect conjoint rotation of the two plates in their function of clampingly engaging the grippable clutch disk 25 from opposite sides. Drive is transmitted from the drive plate 12 and the back plate 24 to the pressure plate 23 through the medium of at least one pair of lug bifurcations 52 on the latter which straddle and torsionally engage one or more of the inside bosses 45 carried by the clutch drive plate 12. The bifurcations 52 straddling the bosses 45 permit axial travel of the pressure plate 23 relative to the drive plate 12 and to the back plate 24 but at the same time hold the pressure plate rotatively fast to the named plates for conjoint rotation therewith.

The pressure plate 23 is adapted to be urged by fluid pressure toward the driven plate 25 and the backing plate 24 to grippingly engage the driven clutch plate between the pressure plate 23 and the back plate 24 for effecting a driving connection between the clutch drive plate 12 and the driven or output shaft 20. The pressure plate 23 has the form of an annular piston like plate having an axially extending cylindrical flange 53 protruding into the annular cavity within the cylindrical portion 38 of the clutch drive plate, the cylindrical surface inside the cylindrical portion 38 on the plate cooperating with the flange 53 of the pressure plate 23 to guidingly support the pressure plate for movement toward and away from the driven plate 25. The pressure plate 23 has an outer peripheral region extending radially outwardly from the flange 53, this region being identified at 55 and serving two functions, first to mount the lug bifurcation 52 thereupon in a radially outward attitude thereto and second to form a stop means engageable with the mounting portion 47 on the clutch drive plate to limit movement of the pressure plate 23 away from the driven plate 25.

In Figure 1 the clutch drive plate and the pressure plate cooperatively define a sealed fluid pressure chamber 56 of limited axial and radial extent. Specifically the fluid pressure chamber 56 is terminated at its radially outer limits by means of the annular flange 53 of the pressure plate and the adjacent cylindrical inner surface of the cylindrical portion 38 of the flywheel plate, the flange of the former having an annular groove thereon for receiving non-metallic deformable seal ring 57 which may be of the rubber O ring seal type for preventing the escape of fluid from the chamber 56 between the opposed surfaces of the cylindrical portion 38 and the adjacent slidable flange 53. Set within the cup shaped hub 14 of the clutch driving plate 12 and mounted about the extreme forward end of the output shaft 20, which end may be splined, a hollow stub sleeve 58 is provided which together with the end of the shaft 20 defines an internal annular space. Registering with one another at opposite sides of the annular space there is further provided a pair of radially extending passages 63, 64 formed through the sides of the stub sleeve 58 and the shaft 20, the latter being hollow. Fluid in the chamber 56 is sealed in and prevented from escaping therefrom at its inner periphery by means of a rubber O ring seal 59 received in an external groove in the stub sleeve 58 and slidingly sealingly engaging a cylindrical hub portion provided on the pressure plate 23. Fluid is introduced into the clutch space 56 through the registering passages 63, 64, the former of which communicates at its outer end with the chamber 56 and at its inner end with the included annular space already noted and the latter communicating at its outer end with the included annular space just named and communicating at its inner end with the hollow interior of the output driven shaft 20.

It will be apparent that the present flywheel and clutch drive plate assembly achieves a feature of parallelism between its parts suitable for accurate torsional balance and achieves an improved compactness making the clutch suitable for use in conjunction with automatic and semi-automatic transmissions which require that the space available for the engine clutch be reduced to a minimum. In view of the fact that the component parts of the flywheel plate and clutch drive plate assembly are formed of sheet metal stampings, maximum economy of construction is obtained. Such stampings may be readily formed to achieve a compact design. The tabs 42 for mounting the flywheel plate 22 when deflected flat in their normal in-use position, have an attitude of closely spaced juxtaposition to the plate of the mounting flange 43 from which they are sheared. These tabs are apertured and slid over the stud bosses to a point at which the plane of the flywheel and the plane of the converter housing are juxtaposed to one another. By the present improvement the set of threaded hold down nuts is threaded over the stud bosses so as to collapse the tabs toward the plane of the flywheel and at the same time to hold the flywheel and the converter case under preloaded compression against one another. The tabs act as springs to enforce this compression, and occupy little or no axial space in this compact improved arrangement.

In the operation of the clutch, pressure fluid may be introduced from the hollow shaft 20 and admitted to the series connected aligned radial openings 64, 63 in the shaft 20 and stub sleeve 58 respectively and then led to the pressure chamber 56 formed by the respective pressure and driving plates 23, 12 to effect operation of the piston like pressure plate 23 to clamp the driven clutch plate between the pressure and back plates 23, 24 for drivingly connecting the driving plate 12 and the output shaft 20, thus disabling or locking out the converter 10. Upon release of fluid pressure in the pressure chamber 56, pressure fluid in the hydraulic torque converter 10 will move the pressure plate toward the drive plate 12 to effect disengagement of the clutch. More particularly, and as shown in Figure 1, the pressure fluid in the torque converter has access to a compartment 65 between the pressure plate 23 and the clutch plate 30 owing to the noted circumferentially aligned slots provided in the latter for receiving the damper spring 29. It is contemplated that fluid under pressure be continuously transmitted to the hydraulic torque converter 10 by suitable means such as a longitudinally extending passage in the output shaft 20 and thence radially through the hub of the torque converter into the toric space therewithin. The fluid under pressure in the torque converter is substantially less than that of the fluid under pressure admitted to the chamber 56 of the flywheel and clutch drive plate assembly such that the pressure plate 23 may be moved toward and into engagement with the driven clutch plate 25 notwithstanding that the hydraulic torque converter fluid pressure opposes such movement from the torque converter side of the pressure plate 23. Pressure from the torque converter however is effective to move the pressure plate 23 toward the flywheel and clutch drive plate 12 upon release of fluid pressure in the chamber 56.

As herein disclosed the clutch drive plate of the present invention incorporates short generally cylindrical external bosses which are welded thereto and which are integral with the attaching studs shown at 40. It is evident that the bosses may be dispensed with and that the studs themselves may be welded directly to the clutch driving plate 12 whereupon the tabs over the studs for attaching the flywheel may be clamped and deflected directly against the clutch driving plate so as to insure parallelism between the planar portion of the flywheel 43 and the reference portion of the clutch driving plate 12. So also the drawing shows a pressure plate which is held against relative rotational movement with respect to the clutch drive plate and to the back plate by means of straddle type lugs or bifurcations but self-evidently link straps or other indexing means of well known construction may be substituted to effect this non-rotative condition.

Variations within the spirit and scope of the invention described are equally comprehended by the foregoing description.

What is claimed is:

1. A flywheel stamped from sheet metal having a channel shaped section opening in an axial direction relative to the flywheel and defined in part by means of a radial mounting flange portion opposite to the open side of the channel, and springy mounting tabs sheared out of the channel section and disposed in freely relaxed position at an angle to the plane of the mounting flange portion.

2. A flywheel plate stamped from springy sheet metal and having a channel shaped section including a radial mounting flange portion opposite the open side of and defining a part of the channel, and a tab sheared out of the mounting flange portion on the open side of the channel section and having a fastener receiving opening therein adapted to receive a clamping fastener device for springily deflecting the tab into a clamped position of closely spaced juxtaposed parallelitivity to the plane of the mounting flange portion.

3. In a flywheel and clutch assembly, a driving plate having a plurality of stud carrying bosses secured thereto with their inner ends fast to an accurately transverse reference portion of the plate, and a flywheel stamped from springy metal and incorporating a channel shaped section having a radial mounting flange portion adapted abuttingly to engage the reference portion of the driving plate, and tabs sheared out of the mounting flange portion of the flywheel adapted to be clamped against the bosses so as to compress the attaching flange portion flush with and parallel to the reference portion of the driving plate.

4. In a flywheel and clutch assembly driven by means of a crankshaft, a drive plate having a plurality of bosses secured thereto with their inner ends fast to an accurately transverse backing portion of the plate, and a flywheel drivingly connected to the crankshaft and incorporating a channel shaped section having a radial mounting flange portion opposite to the open side of the channel, said mounting flange portion adapted abuttingly to engage the backing portion of the drive plate, and tabs carried by the mounting flange portion of the flywheel adapted to be clamped against the bosses so as to compress the attaching flange portion flush to the backing portion of the drive plate.

5. In a flywheel and clutch assembly driven by means of a crankshaft, a drive plate having a plurality of bosses secured thereto with their inner ends fast to an accurately transverse backing portion of the plate, and a flywheel drivingly connected to the crankshaft and incorporating a channel shaped section having a radial mounting flange portion opposite to the open side of the channel, said mounting flange portion adapted abuttingly to engage the backing portion of the drive plate, and tab means carried by the flywheel adapted to be clamped against at least one of said bosses to compress the attaching flange portion flush with the backing portion of the drive plate.

6. In combination, a portion of a transmission casing having an accurately transverse reference surface and provided with a plurality of stud bosses welded to said surface, and a flywheel formed with a channel shaped section having a radial mounting flange portion opposite the open side of the channel and adapted to engage such surface in exact parallel contact thereto, and spring means carried by the flywheel and adapted to be clamped against the stud bosses for preloading the aforesaid contact between the surfaces in compression.

7. In an interconnected crankshaft and encased transmission arrangement, the combination of a flanged portion of the crankshaft, a portion of the transmission casing having an accurately transverse reference surface and provided with a plurality of stud means secured to said surface, a flywheel having a radial mounting flange portion adapted to engage such surface in exact parallelism thereto, spring means adapted to be clamped over the stud means for preloading the aforesaid contact between the surfaces, and hub means integral with the flywheel for attachment to the flanged portion of the crankshaft.

8. A flywheel pate incorporating a radial mounting flange portion, a flange connected to the mounting flange portion and extending from one side thereof axially of the plate, tabs for mounting the flywheel deflected out of the same side of the mounting flange portion of the plate, and a set of ring gear teeth carried by said axially extending flange.

References Cited in the file of this patent

UNITED STATES PATENTS

| | | |
|---|---|---|
| 996,945 | Sharick | July 4, 1911 |
| 1,532,962 | Turner | Apr. 7, 1925 |
| 1,771,370 | Benge | July 22, 1930 |
| 1,861,226 | O'Connor | May 31, 1932 |
| 2,623,411 | Herndon | Dec. 30, 1952 |
| 2,694,478 | Zeidler | Nov. 16, 1954 |

FOREIGN PATENTS

| | | |
|---|---|---|
| 21,421 of 1907 | Great Britain | July 16, 1908 |